(12) United States Patent
Bryan, Jr.

(10) Patent No.: US 7,815,401 B2
(45) Date of Patent: Oct. 19, 2010

(54) SYSTEM FOR TRANSPORTING GROSSLY ASYMMETRICAL OBJECTS SUCH AS A CLUSTER OF GRAPES OR OTHER FRUIT THROUGH A PNEUMATIC TUBE

(75) Inventor: Vincent E. Bryan, Jr., Quincy, WA (US)

(73) Assignee: Picker Technologies LLC, Mercer Island, WA (US)

( * ) Notice: Subject to any disclaimer, the term of this patent is extended or adjusted under 35 U.S.C. 154(b) by 0 days.

(21) Appl. No.: 12/511,879

(22) Filed: Jul. 29, 2009

(65) Prior Publication Data
US 2010/0135734 A1 Jun. 3, 2010

Related U.S. Application Data

(60) Provisional application No. 61/085,271, filed on Jul. 31, 2008.

(51) Int. Cl.
*B65G 53/00* (2006.01)
(52) U.S. Cl. .................. 406/197; 406/113; 406/151; 406/184; 406/191
(58) Field of Classification Search .................. 406/113, 406/151, 184, 191, 196, 197
See application file for complete search history.

(56) References Cited

U.S. PATENT DOCUMENTS

| | | | |
|---|---|---|---|
| 1,922 | A | 12/1840 | Clegg, S. |
| 1,114,318 | A | 10/1914 | Vasey |
| 1,626,402 | A | 4/1927 | Fryman |
| 2,129,874 | A * | 9/1938 | Ross .......................... 209/477 |

(Continued)

FOREIGN PATENT DOCUMENTS

WO  WO 00/62594 A1  10/2000

(Continued)

OTHER PUBLICATIONS

Brennan, J. "Beach Pneumatic: Alfred Beach's Pneumatic Subway and the Beginnings of Rapid Transit in New York." 2004-05, web publ. at http://www.columbia.edu/~brennan/beach/.

*Primary Examiner*—Joe Dillon, Jr.
(74) *Attorney, Agent, or Firm*—Todd S. Parkhurst, Esq.

(57) ABSTRACT

A pneumatic tube transport system for grossly irregular shaped objects is disclosed. The system comprises a pneumatic tube and a series of one or more flexible, sealable bags adapted to contain the objects to be transported. The bags may be fenestrated, but, if desired, the bags can be designed and manufactured so that when they are filled and sealed, they can assume a generally inflated shape. The bags can be made out of a thin material such as that found in a grocery store produce section or check out area. A bag providing apparatus can be supplied either to the individual picker in the field or to the region near the entry to the pneumatic tube. If desired, an inflating device and a bag sealing device can be provided. After placement of the object(s) into the bag these devices can inflate and the seal the bag and then allow for its quick release and deposition at the entry end of the pneumatic tube. In accordance with another aspect of the invention, the tube can be provided with a series of baffles to encourage rapid yet gentle travel of the bag and the enclosed fruit or other objects down the pneumatic tube.

5 Claims, 4 Drawing Sheets

U.S. PATENT DOCUMENTS

| | | | |
|---|---|---|---|
| 2,288,682 A | 7/1942 | Chittenden | |
| 2,545,072 A | 3/1951 | Denman | |
| RE023,524 E | 7/1952 | Denman | |
| 2,650,464 A * | 9/1953 | Bernheim | 56/328.1 |
| 2,680,338 A | 6/1954 | Space | |
| 2,711,625 A | 6/1955 | Bullock | |
| 2,841,446 A * | 7/1958 | Trotter | 406/108 |
| 2,968,907 A | 1/1961 | Bernheim et al. | |
| 3,348,647 A | 10/1967 | Gates et al. | |
| 3,413,787 A | 12/1968 | Van Antwerp et al. | |
| 3,460,330 A | 8/1969 | Black, Jr. | |
| 3,464,529 A | 9/1969 | Horsky, Jr. | |
| 3,473,312 A | 10/1969 | Holt | |
| 3,507,107 A | 4/1970 | Harms et al. | |
| 3,512,735 A * | 5/1970 | Hallstrom | 406/7 |
| 3,538,695 A | 11/1970 | Carnell | |
| 3,559,387 A | 2/1971 | Myers | |
| 3,584,442 A | 6/1971 | White | |
| 3,591,949 A | 7/1971 | Connery | |
| 3,664,104 A | 5/1972 | Jamshidi | |
| 3,756,001 A | 9/1973 | Macidull | |
| 3,767,268 A * | 10/1973 | Stucky | 119/844 |
| 3,854,273 A | 12/1974 | Rosenberg | |
| 3,898,785 A | 8/1975 | Chew | |
| 3,913,307 A | 10/1975 | Cardinal, Jr. | |
| 3,969,878 A | 7/1976 | Morganeier | |
| 4,000,602 A | 1/1977 | Cardinal, Jr. | |
| 4,184,792 A * | 1/1980 | Turnbo | 406/51 |
| 4,320,995 A | 3/1982 | Tennes et al. | |
| 4,388,798 A | 6/1983 | Gerber | |
| 4,394,259 A | 7/1983 | Benny et al. | |
| 4,476,670 A * | 10/1984 | Ukai et al. | 56/328.1 |
| 4,491,212 A | 1/1985 | Gray, Jr. | |
| 4,501,113 A | 2/1985 | Gerber | |
| 4,558,561 A | 12/1985 | Mendenhall | |
| 4,665,956 A * | 5/1987 | Freeman | 141/5 |
| 4,674,265 A | 6/1987 | Gerber | |
| 4,704,851 A | 11/1987 | Manor | |
| 4,750,602 A | 6/1988 | Souda | |
| 5,007,772 A | 4/1991 | McKenna et al. | |
| 5,125,223 A | 6/1992 | McKenna et al. | |
| 5,280,697 A | 1/1994 | Miller | |
| 5,287,586 A * | 2/1994 | Dentzau | 15/303 |
| 5,319,911 A | 6/1994 | Wilhite | |
| 5,328,301 A * | 7/1994 | Oirschot | 406/171 |
| 5,373,597 A * | 12/1994 | Worsham | 15/21.2 |
| 5,458,899 A * | 10/1995 | Floyd et al. | 426/404 |
| 5,573,356 A * | 11/1996 | Henderson | 406/186 |
| 5,599,157 A | 2/1997 | Ellington | |
| 5,840,102 A | 11/1998 | McCracken | |
| 5,878,562 A | 3/1999 | Cernusco | |
| 5,919,504 A * | 7/1999 | Muise et al. | 426/106 |
| 5,984,590 A * | 11/1999 | Church et al. | 406/48 |
| 6,034,342 A * | 3/2000 | Schmoutziguer et al. | 209/127.1 |
| 6,045,838 A * | 4/2000 | Davis et al. | 426/106 |
| 6,182,431 B1 | 2/2001 | Balchen | |
| 6,371,711 B1 * | 4/2002 | Berger | 414/160 |
| 6,565,290 B2 * | 5/2003 | Smith | 406/188 |
| 6,827,529 B1 | 12/2004 | Berge et al. | |
| 7,695,220 B2 * | 4/2010 | Bryan et al. | 406/84 |
| 2005/0172595 A1 | 8/2005 | Wells et al. | |
| 2008/0010961 A1 | 1/2008 | Gray | |

FOREIGN PATENT DOCUMENTS

WO    WO 2008/118915 A9    10/2008

* cited by examiner

SYSTEM FOR TRANSPORTING GROSSLY ASYMMETRICAL OBJECTS SUCH AS A CLUSTER OF GRAPES OR OTHER FRUIT THROUGH A PNEUMATIC TUBE

This application claims priority from U.S. provisional patent application Ser. No. 61/085,271 filed Jul. 31, 2008 entitled "Device and Means to Transport Grossly Asymmetrical Objects Such as a Cluster of Grapes through a Pneumatic Tube" which is incorporated herein in its entirety by reference.

BACKGROUND OF THE INVENTION

Even though agricultural harvesting has been automated in many cases, the picking of objects such as wine grapes in a vineyard is still very often a manual operation. Handpicked grape clusters are placed by the worker into relatively small boxes termed lugs. When a lug is filled, it is carried to a location in the field row where each grape cluster is placed into a fenestrated plastic bag. The filled bags are then loaded into boxes for transport to storage or the marketplace. Generally, similar manual systems are used to harvest and collect strawberries, cherries, and other fruits and agricultural produce. Indeed, generally similar manual systems are used to collect and transport a wide variety of agricultural and industrial objects.

Fenestrated bags for handling and storing grapes, cherries, strawberries and other fruits, produce items and other objects are disclosed in U.S. Pat. No. 6,045,838. Fresh produce bags and lugs are disclosed in U.S. Pat. Nos. 5,458,899 and 5,919,504. Other thin flexible plastic bags are commonly provided, free of charge, in the produce sections of many retail grocery stores. Currently such bags are produced from various known plastics such as polypropylenes or mixtures of polyethylenes. If desired, slits or small holes, termed micropores, can be formed in the bag sides to permit sulfur dioxide or other gases to be introduced into the bag interiors to preserve grape freshness while minimizing water loss from the grapes. These preservative gases gradually escape through the bag fenestrations over a period of time (usually hours or days) and are replaced by ambient air.

When a grossly irregularly shaped object such as a cluster of grapes or cherries is presented to the open end of a pneumatic tube, it does not necessarily advance down the pneumatic tube due to the fact that an incomplete and relatively ineffective air seal is present between the interior of the tube or tube baffles and the object. The object's irregular shape allows for the passage of air between the object and the interior of the tube or, in the case of a grape cluster, through the air gaps between individual grapes. Because there is little or no air pressure differential across the grape cluster or other irregularly shaped object to be transported, the small suction force acting on the object is insufficient to cause the object to move down the tube in a positive and regular manner. The objects to be transported can be fruits such as grapes, strawberries, raspberries, blueberries, or cherries; or other agricultural or nonagricultural objects can be enclosed within the bags.

SUMMARY OF THE INVENTION

However, field experimentation has shown that if a grossly irregularly shaped object—for example, a grape cluster—is placed into a bag made of thin plastic or other suitable material which is then sealed, that package containing the objects and some air, or other gas, can be reliably transported down a pneumatic tube. More specifically, the sealed bag can be presented to the pneumatic tube so that an air seal is created between the exterior of the bag and the interior of the pneumatic tube or its baffles. Under these conditions, the bag containing the object will be rapidly advanced down the pneumatic tube without damage to the contained object.

In a preferred embodiment of the invention, the bag is made of a material pierced by micropores or other fenestrations allowing it to "breath" but in the short run allowing it to contain most of the trapped gas for a few seconds to minutes or more. These preferred bags can be used to move fruit, vegetables or other objects through the pneumatic tube to a desired location, and they have the ventilating advantages which permit the reduction of fungal growth on the contained object as in the case of some fruits and vegetables. In some embodiments of the invention, the small size of the bag sidewall fenestrations permit the bags to be at least temporarily retain air trapped within the bags. The bags will retain the air and their inflated shape for the time required (a matter of seconds) to travel along a pneumatic transport tube. Additionally, if the bag containing the object is decelerated by water at the outlet from the pneumatic tube, it will float, making extraction from the water bath easier while keeping the contained object(s) dry.

OBJECTS OF THE INVENTION

It is an object of this invention to transport objects having grossly irregular shapes such as picked cherry or grape clusters from various picking sites to a central collection point. This can be accomplished via a pneumatic tube transport system of the type disclosed and claimed in co-pending U.S. utility patent application Ser. No. 12/055,209 entitled "Transport System for Fruit and Like Objects" and co-pending U.S. utility patent application Ser. No. 12/371,446 entitled "Mobile System For Improving the Picking and Preliminary Processing Of Apples, Citrus, Stone Fruit and Like Objects." These applications and the patents maturing from them are hereby incorporated by reference.

It is another object of this invention to maximize labor effectiveness while minimizing labor costs in the harvesting of discrete-object crops such as grapes, cherries, strawberries, and/or the handling of other agricultural and nonagricultural objects.

Other objects and advantages of the invention will become apparent upon reading the following detailed description and upon reference to the drawings. Throughout the drawings, like reference numerals refer to like parts.

DETAILED DESCRIPTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
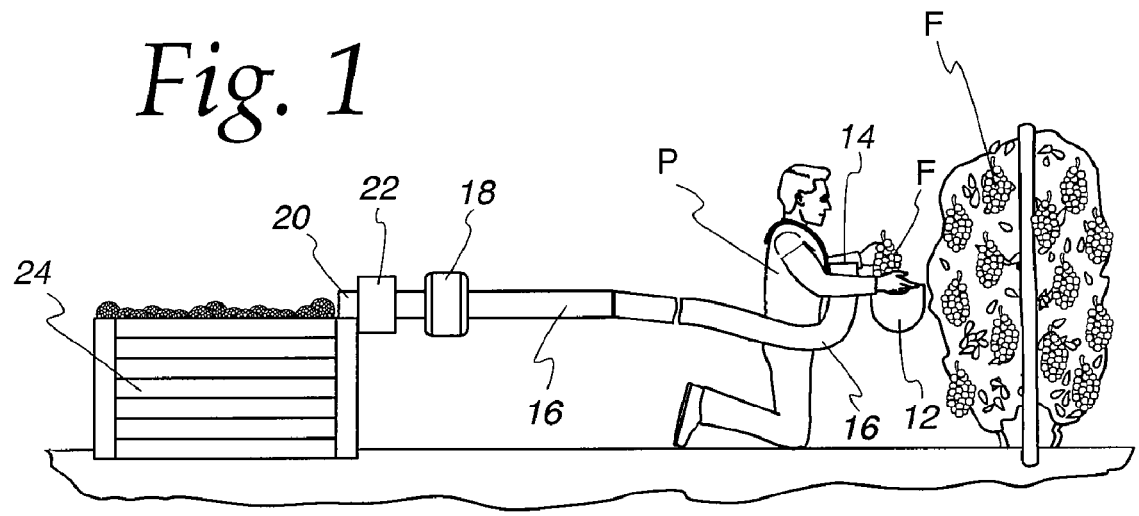
FIG. 1 is a somewhat schematic elevational drawing of exemplary grape clusters being harvested and transported using the novel invention.

Turning first to FIG. 1, there is shown a picker P who is harvesting, for example, fruits F such as ripe grape clusters in a vineyard. In accordance with one aspect of the invention, the picker P places the grape cluster F in a fenestrated bag 12. If desired, he can slightly inflate the bag 12 by any convenient and known means. He then seals the bag, and then drops the sealed bag 12 into the inlet 14 of a pneumatic transport tube 16. A downstream vacuum generator 18 draws the slightly inflated bag 12 from the inlet 14 to a discharge end 20, where the bagged grape clusters are discharged through a decelerator 22 into a collection bin 24. If the bag containing the object is decelerated by water at the outlet of the pneumatic tube, it will float, making extraction from the water bath easier while keeping the contained object dry. As indicated above, when the bin 24 is filled, it is then transported to storage or the marketplace in known manner.

As indicated above, these bags 12 can be fenestrated, and they can be sized and shaped so that, when they are filled and then sealed, they assume a size and shape which will engage the interior surfaces of the pneumatic transport tube, or the baffles mounted inside the tube if the tube is so configured, as suggested particularly in FIGS. 2-5. Field experimentation has shown that these bags 12 will maintain their general volume and integrity during the relatively short period of time (usually a matter of seconds) required to transport the sealed bag 12 and the enclosed grape cluster F or other objects from the tube inlet 14 to the tube discharge end 20. Alternatively, the bags could be fenestrated by known means after transport has been completed.

Various embodiments of the transport tube 16 are shown in FIGS. 2-6. In accordance with one aspect of the invention, the tube 16 is provided with a series of toroidal baffles 26. These baffles 26 are formed of suitably resilient material, and are sized and shaped so as to engage, deform, and then release the inflated bags 12. The travel motion T of these bags and the enclosed grape clusters F is caused by the air pressure differential created across the baffles 26 and engaged bags 12. That air pressure differential is caused by the vacuum generator 18, or by an upstream end pressure generator.

Figure 2:
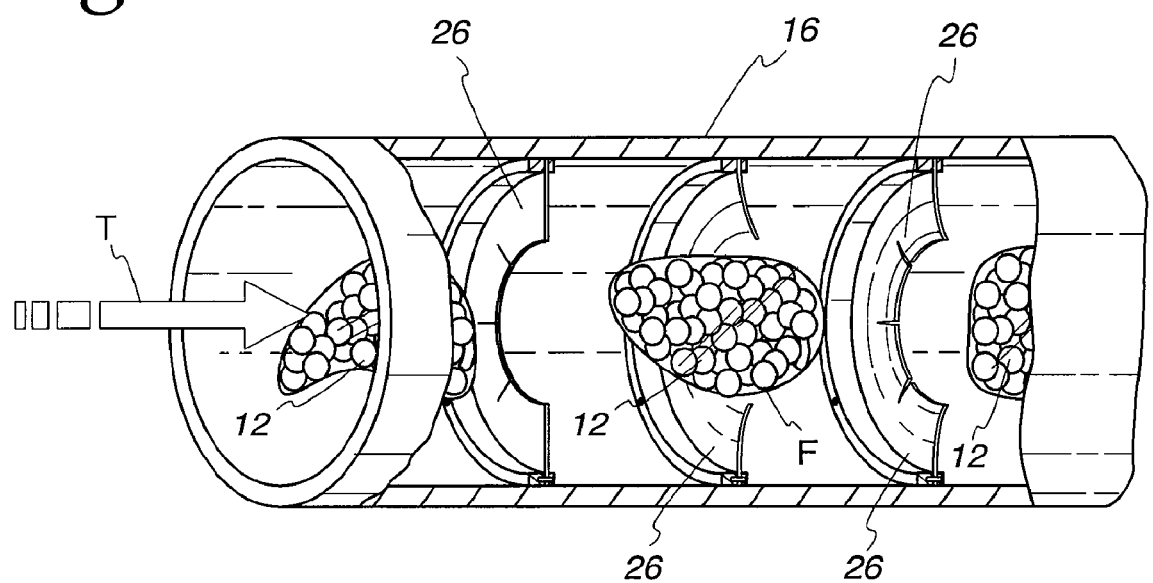
FIG. 2 is a side elevational view in partial section showing the transport of picked and bagged grape clusters being transported through a pneumatic tube.
Figure 3:
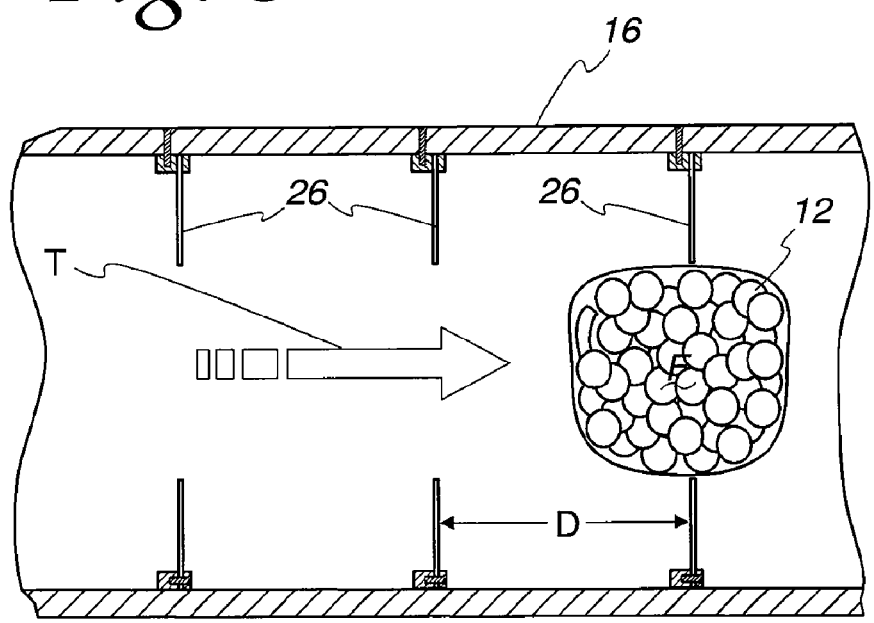
FIG. 3 is a sectional view similar to FIG. 2 showing the picked and bagged grape clusters being transported through a pneumatic tube.
Figure 4:
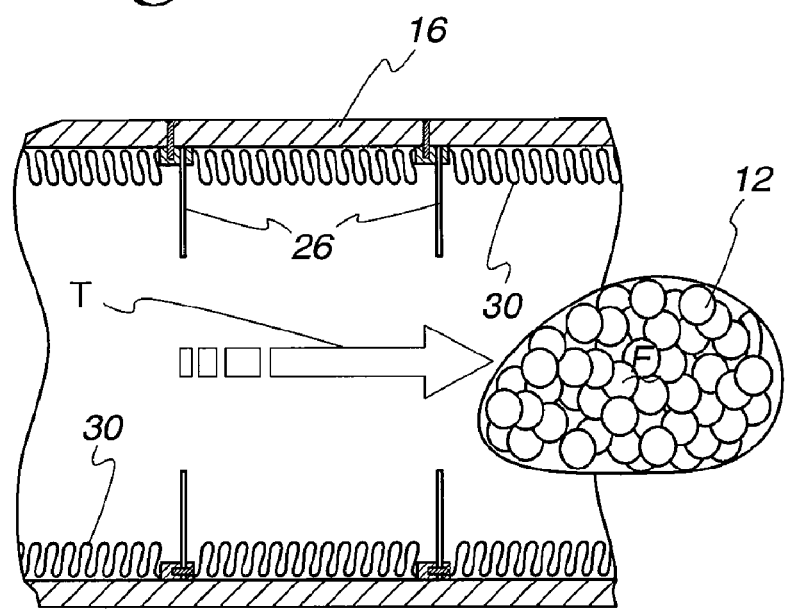
FIG. 4 is a sectional view is similar to FIG. 3 but showing the bagged grape clusters being transported through a pneumatic tube, the tube having an interior construction somewhat different from that of the tube shown in FIG. 3.

As indicated especially in FIGS. 2, 3 and 4, the baffles 26 are spaced apart within the tube 16 by a distance D such that, as the bag 12 separates from a relatively upstream baffle 26, it almost immediately engages the adjacent relatively downstream baffle. In this way, an air pressure differential is almost continuously created across and around the outside of the bag 12, thus promoting continuous and relatively rapid travel of the bag 12 down the entire length of the tube 16.

As suggested in FIG. 4, if desired, cushioning material 30 can be provided to line the interior surface of the tube 16 so as to inhibit bruising of the grapes or other fruit material F enclosed within the bag 12. This soft resilient material and the orientation of the baffle will direct the bag and object to the next baffle and will inhibit the object from impinging the tube wall. This liner material 30 can, if desired, be flexible and inflatable so as to enhance the resilient effect of the liner 30.

Figure 5:
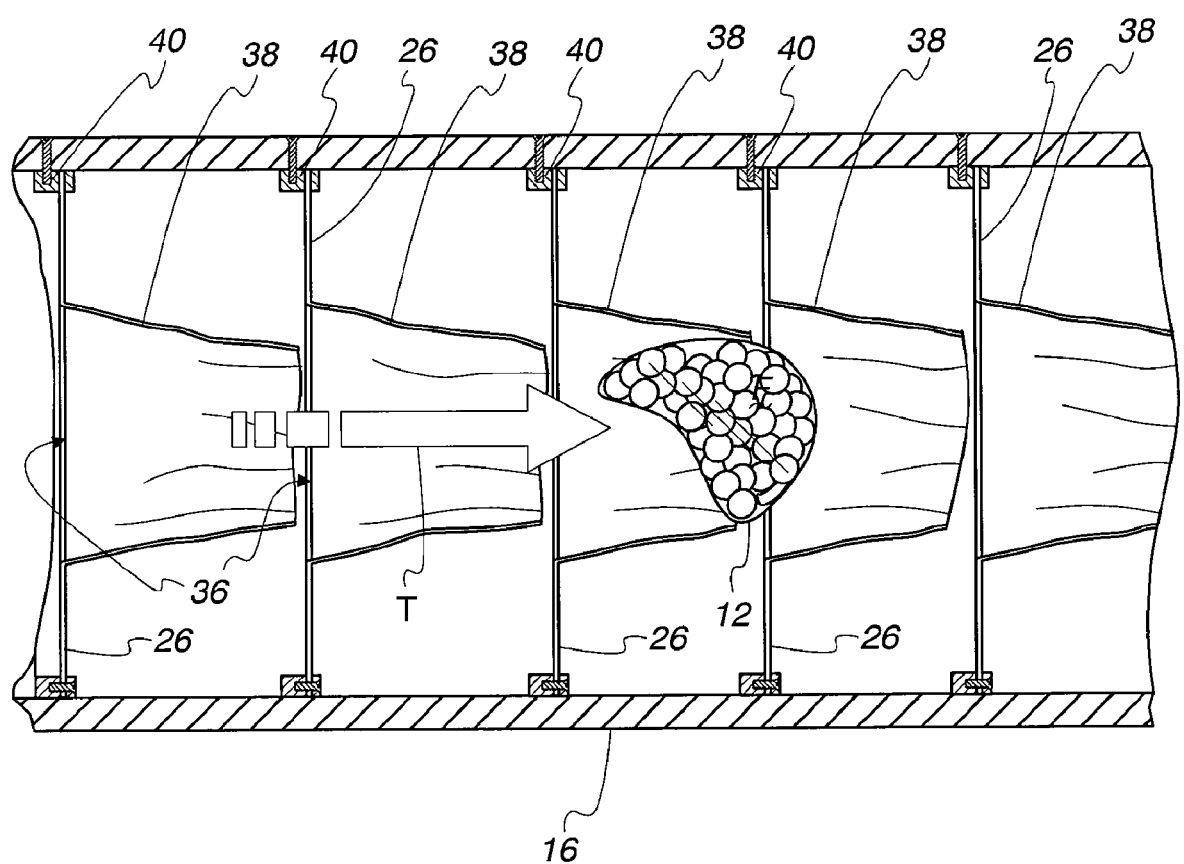
FIG. 5 is a sectional view similar to FIGS. 3 and 4 but showing the bagged grape clusters being transported through a pneumatic tube, the tube having an interior construction and arrangement different from that of the tubes shown in FIGS. 3 and 4.

As suggested particularly in FIG. 5, compound baffles 36 can be provided. These baffles 36 can comprise relatively planar toroidal members 26, to which are attached flexible conical elements 38 which are sized and shaped to collectively continuously engage the bag 12 during its passage between adjacent baffles 26. The traveling bag 12 thus experiences almost continuous air pressure differential as it progresses along the tube 16.

Baffle mounts 40 of any convenient type are provided. The baffles and their openings can have any combination of shapes, including elliptical, oval, slit, square with rounded corners, or triangular with rounded corners.

Figure 6:
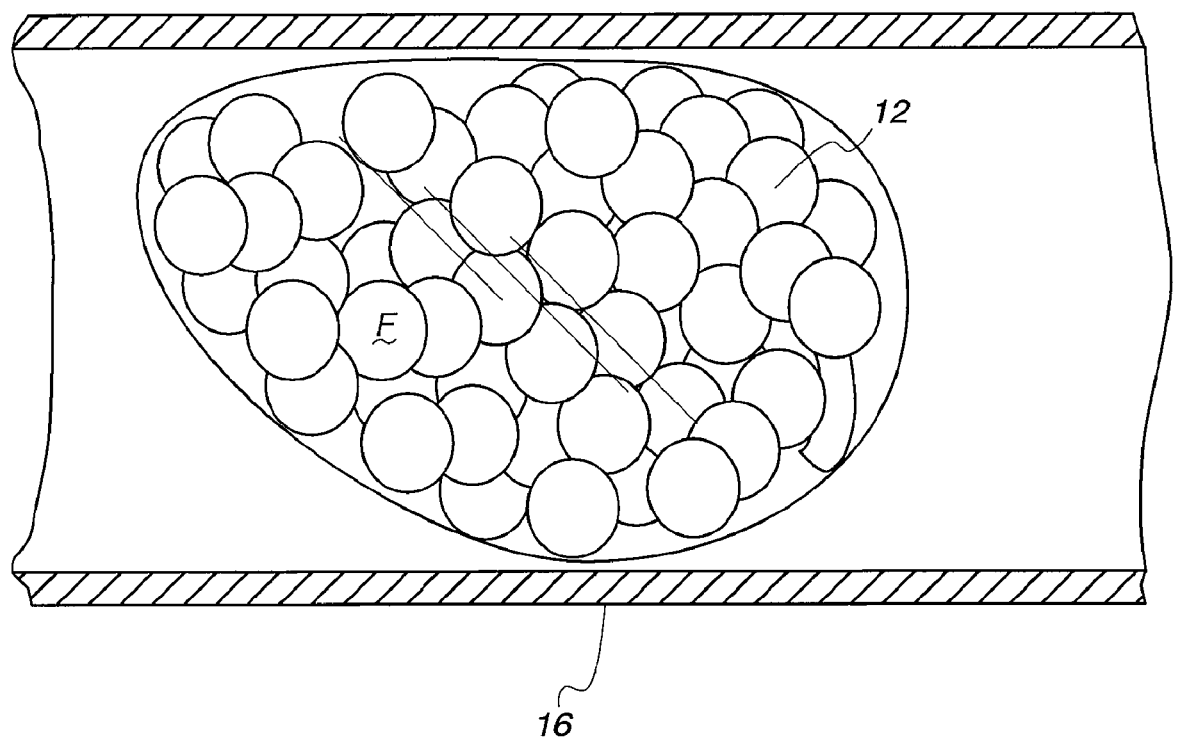
FIG. 6 is a sectional view similar to FIGS. 3 and 4 but showing a bagged grape cluster being transported through a pneumatic tube having no baffles.

In accordance with the embodiment of the invention shown in FIG. 6, the bags 12 can be sized so as to provide a relatively effective sealing fit against the inner surface of the tube 16 itself. In this embodiment, the tube 16 is not provided with any baffles. Continuous air pressure differential across the traveling bags 12 can be provided by the vacuum generator 18 at the tube discharge 20 end, or by other known pressure or vacuum generators.

The invention claimed is:

1. A pneumatic tube transport system for transporting at least one object having a grossly irregular shape comprising:
   a pneumatic tube system comprising a pneumatic tube having a plurality of toroidal baffles mounted at spaced apart intervals within the tube, and a vacuum generator functionally connected to a downstream end of the pneumatic tube;
   at least one flexible, sealable bag constituting a carrier and adapted to contain a gas and said at least one object, in one-to-one correspondence with said at least one object or with a plurality of said at least one object;
   said intervals being constant and of a spacing such that the system is configured and operable to engage the baffles within the tube in sequential order with a momentary sealing effect as said at least one bag and the contained said at least one object moves along the pneumatic tube so as to transport said at least one object.

2. A pneumatic tube transporting system according to claim 1 further including a pressure generator functionally connected to an upstream end of the pneumatic tube.

3. A method of moving at least one object having a grossly irregular shape along the pneumatic tube comprising the steps of,
   providing a pneumatic tube system comprising:
   a pneumatic tube having a plurality of toroidal baffles mounted at spaced apart intervals within the tube, and a vacuum generator functionally connected to a downstream end of the pneumatic tube;
   at least one flexible, sealable bag constituting a carrier and adapted to contain a gas and said at least one object, in one-to-one correspondence with said at least one object or with a plurality of said at least one object;
   said intervals being constant and of a spacing such that the system is configured and operable to engage the baffles within the tube in sequential order with a momentary sealing effect as said at least one bag and the contained said at least one object moves along the pneumatic tube so as to transport said at least one object;
   enclosing said at least one object in said at least one flexible, sealable bag, sealing said at least one bag so that said at least one bag contains a gas and said at least one object, in one-to-one correspondence with said at least one object or with a plurality of said at least one object, and introducing said at least one bag and the contained said at least one object and gas to the upstream end of the pneumatic tube.

4. A method according to claim 3 further including the step of permitting gas outside the bag to enter into the bag through bag fenestrations.

5. A method according to claim 3 further including the step of inflating the bag with a gas to a pressure slightly above ambient pressure.

* * * * *